United States Patent
Shibata et al.

(10) Patent No.: US 10,414,246 B2
(45) Date of Patent: Sep. 17, 2019

(54) AIR-CONDITIONING REGISTER

(71) Applicant: TOYODA GOSEI CO., LTD., Kiyosu-shi, Aichi-ken (JP)

(72) Inventors: Minoru Shibata, Kiyosu (JP); Nobuhiro Terai, Kiyosu (JP); Kenji Asano, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 227 days.

(21) Appl. No.: 15/434,113

(22) Filed: Feb. 16, 2017

(65) Prior Publication Data

US 2017/0259649 A1 Sep. 14, 2017

(30) Foreign Application Priority Data

Mar. 10, 2016 (JP) ................................ 2016-047203

(51) Int. Cl.
*B60H 1/34* (2006.01)

(52) U.S. Cl.
CPC ... *B60H 1/3421* (2013.01); *B60H 2001/3471* (2013.01); *B60H 2001/3478* (2013.01)

(58) Field of Classification Search
CPC .......... B60H 1/3421; B60H 2001/3478; B60H 2001/3471
USPC ....................................................... 454/155
See application file for complete search history.

(56) References Cited

U.S. PATENT DOCUMENTS

| 5,036,753 | A | * | 8/1991 | Ostrand | B60H 1/345 454/155 |
| 5,766,070 | A | * | 6/1998 | Schwarz | B60H 1/3421 454/155 |
| 5,890,958 | A | * | 4/1999 | Greiner | B60H 1/3414 454/155 |
| 6,159,092 | A | * | 12/2000 | Elder | B60H 1/3421 454/152 |

(Continued)

FOREIGN PATENT DOCUMENTS

| DE | 102013101887 A1 | * | 9/2013 | ........... B60H 1/3421 |
| DE | 102014105359 A1 | * | 12/2014 | ........... B60H 1/3421 |

(Continued)

OTHER PUBLICATIONS

Office Action dated Feb. 5, 2019 in the corresponding JP application No. 2016-047203 (with English translation).

*Primary Examiner* — Gregory L Huson
*Assistant Examiner* — Frances F. Hamilton
(74) *Attorney, Agent, or Firm* — Posz Law Group, PLC

(57) ABSTRACT

An air-conditioning register includes a downstream fin, upstream fins, a coupling rod, a shut-off damper, an operation knob, a transmission shaft, an upstream universal joint, a downstream universal joint, and a transmission mechanism portion. The operation knob includes a rotation member. The upstream universal joint couples an upstream end of the transmission shaft to the shut-off damper. The downstream universal joint couples a downstream end of the transmission shaft to the rotation member. The transmission mechanism portion transmits swinging motion of the transmission shaft caused by sliding of the operation knob to the central upstream fins, and prevents swinging motion of the transmission shaft caused by operation of the operation knob to tilt the downstream fin from being transmitted to the central upstream fins.

6 Claims, 10 Drawing Sheets

(56) References Cited

U.S. PATENT DOCUMENTS

| | | | |
|---|---|---|---|
| 6,533,655 B2* | 3/2003 | Demerath | B60H 1/3421 |
| | | | 454/155 |
| 6,780,098 B2* | 8/2004 | Nishida | B60H 1/3414 |
| | | | 454/155 |
| 9,919,585 B2* | 3/2018 | Noichl | B60H 1/3421 |
| 10,112,459 B2* | 10/2018 | Inagaki | B60H 1/3428 |
| 2002/0081965 A1 | 6/2002 | Demerath et al. | |
| 2016/0009163 A1* | 1/2016 | Terai | B60H 1/3421 |
| | | | 454/155 |
| 2017/0259649 A1* | 9/2017 | Shibata | B60H 1/3421 |

FOREIGN PATENT DOCUMENTS

| | | | |
|---|---|---|---|
| DE | 10 2014 100 441 A1 | 7/2015 | |
| DE | 102015101116 A1 * | 8/2015 | F24F 13/1426 |
| DE | 102015101116 A1 | 8/2015 | |
| FR | 2866282 A1 | 8/2005 | |
| JP | 2002-192940 A | 7/2002 | |
| JP | 2014-031046 A | 2/2014 | |

* cited by examiner

Fig.11A
Fig.11B
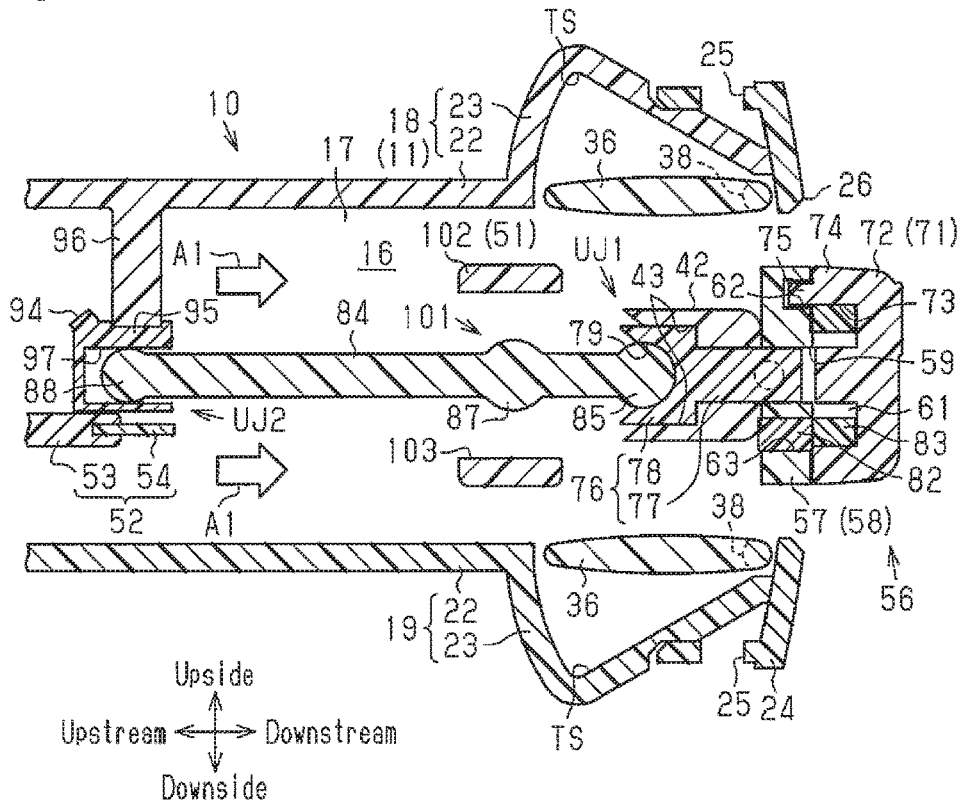
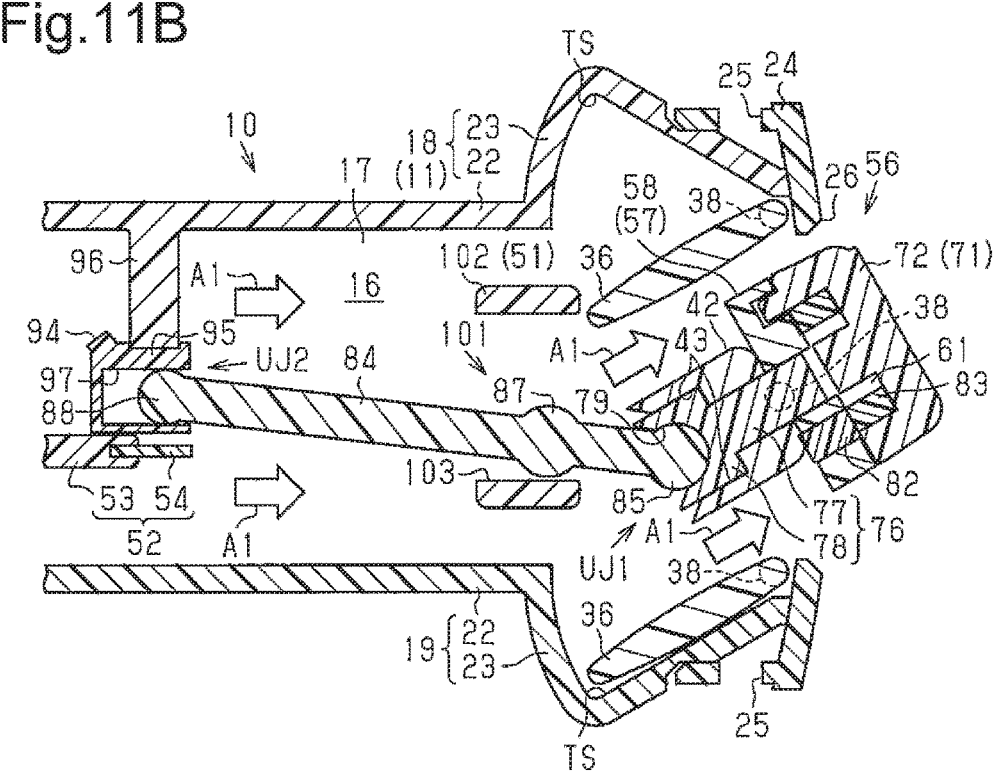

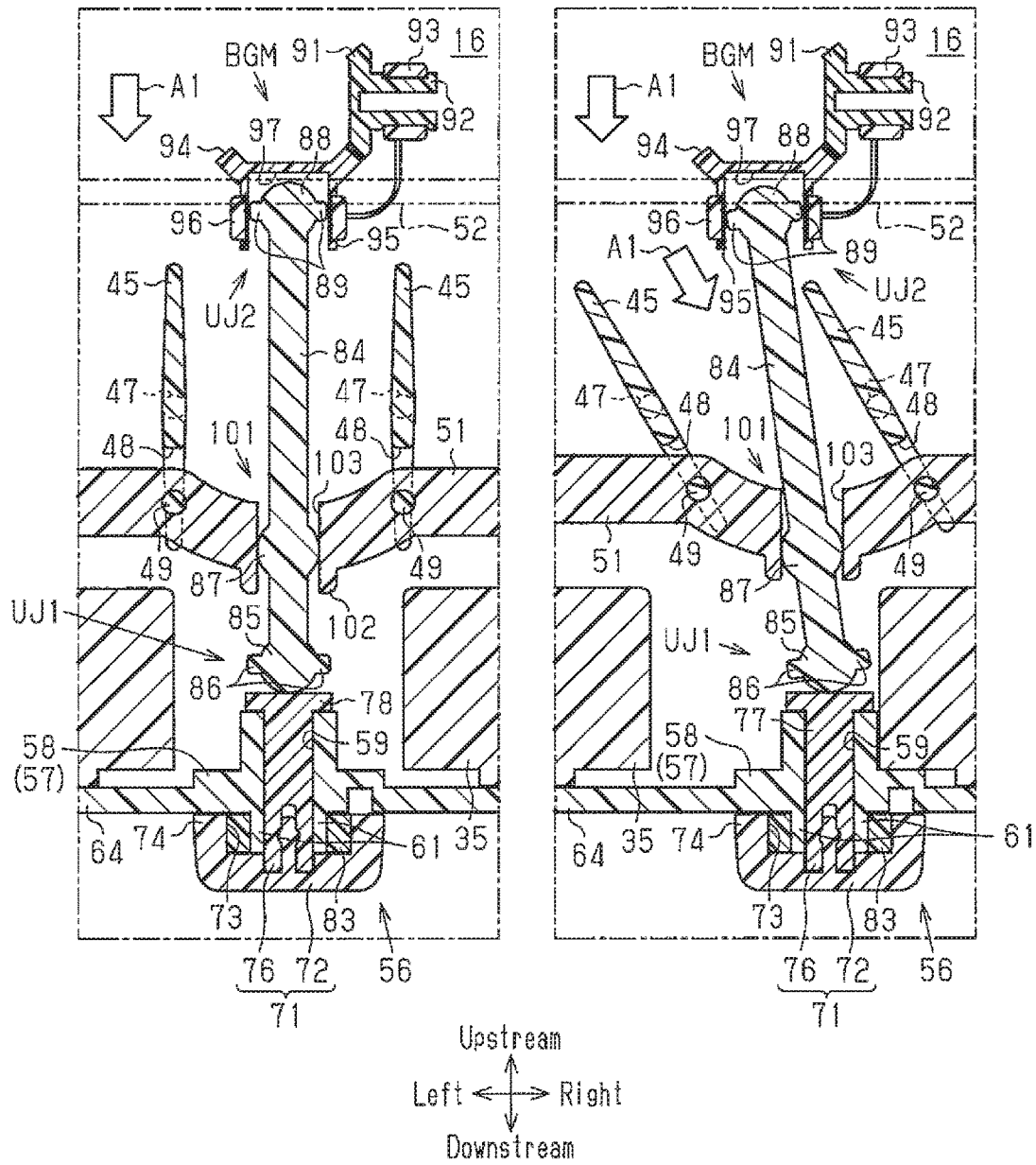

Fig.14(Prior Art)
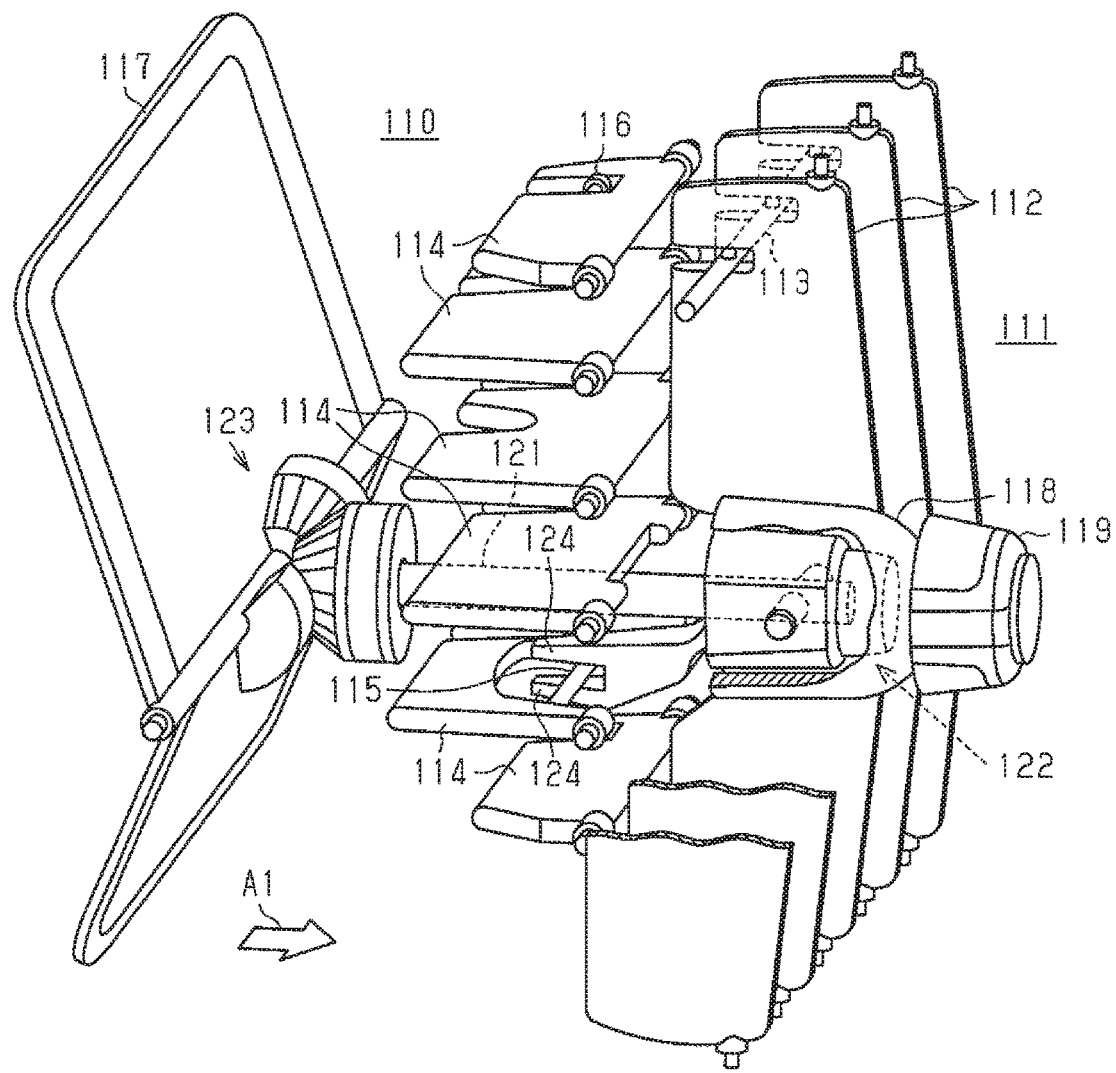
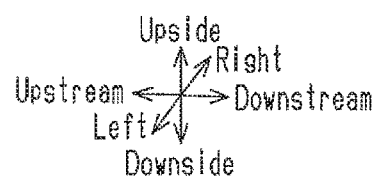

AIR-CONDITIONING REGISTER

BACKGROUND OF THE INVENTION

The present invention relates to an air-conditioning register that blows out air-conditioning air, which is delivered from an air conditioner, through the outlet of an airflow passage. More specifically, the present invention relates to an air-conditioning register having a shut-off damper for opening and closing the airflow passage.

Vehicles have air-conditioning registers, that are installed in the instrument panel and blow air-conditioning air delivered from an air conditioner through outlets. One example of such an air-conditioning register includes downstream fins, upstream fins, and a shut-off damper (for example, German Patent Application Publication No. 102014100441).

As shown in FIG. 14, the air-conditioning register of the publication includes downstream fins 112 arranged upstream of the outlet 111 of an airflow passage 110, upstream fins 114 arranged upstream of the downstream fins 112 in the airflow passage 110, and a shut-off damper 117 arranged upstream of the upstream fins 114 in the airflow passage 110. The downstream fins 112 are tiltable and arranged side by side in the lateral direction. The downstream fins 112 are coupled together by a coupling rod 113, which extends in the lateral direction. The upstream fins 114 are tiltable and arranged in the vertical direction. The upstream fins 114 are coupled together by a coupling rod 116, which extends in the vertical direction.

An operation knob 118, which has a rotation member 119, is slidably attached to one of the downstream fins 112 that is located at the center in the arrangement direction (the lateral direction). A transmission shaft 121, which extends in the flowing direction of air-conditioning air A1 in the airflow passage 110, is arranged between two adjacent upstream fins 114 that are located at the center in the arrangement direction (the vertical direction). The downstream end of the transmission shaft 121 is coupled to the rotation member 119 via a universal joint 122. The upstream end of the transmission shaft 121 is coupled to the shut-off damper 117 via a bevel gear mechanism 123.

Further, the operation knob 118 has a bifurcated fork portion 124. The fork portion 124 is located at a location offset in the arrangement direction (the vertical direction) of the upstream fins 114 from the transmission shaft 121, and sandwiches a transmission shaft portion 115 provided on a specific upstream fin 114 from above and below. In some cases, a rack-and-pinion (not shown) is employed in place of the fork portion 124 and the transmission shaft portion 115.

With the above described air-conditioning register, when a force in the arrangement direction (the lateral direction) of the downstream fins 112 is applied to the operation knob 118, the downstream fin 112 provided with the operation knob 118 is tilted. The tilting motion of this downstream fin 112 is transmitted to the other downstream fins 112 by the coupling rod 113. All the downstream fins 112 are thus tilted in synchronization.

In contrast, when the operation knob 118 is slid along the downstream fin 112 in the arrangement direction of the upstream fins 114 (the vertical direction), the sliding motion is transmitted to the upstream fin 114 provided with the transmission shaft portion 115 via the fork portion 124 and the transmission shaft portion 115, so that the upstream fin 114 is tilted. The tilting motion of this upstream fin 114 is transmitted to the other upstream fins 114 by the coupling rod 116. All the upstream fins 114 are thus tilted in synchronization. The tilting motions of the downstream fins 112 and the upstream fins 114 change the direction of the air-conditioning air A1 blown out of an outlet 111.

Further, when the rotation member 119 is rotated, the rotation is transmitted to the shut-off damper 117 via the universal joint 122, the transmission shaft 121, and the bevel gear mechanism 123. This tilts the shut-off damper 117, so that the airflow passage 110 is opened or closed.

As described above, in the air-conditioning register described in German Patent Application Publication No. 102014100441, the rotation member 119 is incorporated in the operation knob 118. If the rotation member 119 were provided at a location different from the operation knob 118, an additional space for installing the rotation member 119 would be needed. However, such a space is unnecessary in the air-conditioning register of the publication.

In the air-conditioning register disclosed in German Patent Application Publication No. 102014100441, the upstream fin 114 on which the transmission shaft portion 115 is provided is different from the upstream fin 114 located at the center in the arrangement direction (vertical direction). Thus, when the operation knob 118 is slid, the fork portion 124 and the transmission shaft portion 115 transmit force on an upstream fin 114 that is different from the one that is located at the center in the arrangement direction (the vertical direction). Therefore, the operational torque significantly fluctuates when the operation knob 118 is slid, which degrades the operational feeling.

SUMMARY OF THE INVENTION

Accordingly, it is an objective of the present invention to provide an air-conditioning register capable of reducing fluctuations of the operational torque when an operation knob is slid, thereby improving the operational feeling.

To achieve the foregoing objective and in accordance with one aspect of the present invention, an air-conditioning register is provided that includes a downstream fin, a plurality of upstream fins, a coupling rod, a shut-off damper, an operation knob, a transmission shaft, an upstream universal joint, a downstream universal joint, and a transmission mechanism portion. The downstream fin is arranged in an airflow passage for air-conditioning air, and is tiltably supported with a pivot. The upstream fins are arranged upstream of the downstream fin in the airflow passage. Each of the upstream fins is tiltably supported with a pivot. Two adjacent ones of the upstream fins that are located in a center in an arrangement direction are central upstream fins. The coupling rod couples the upstream fins together at sections displaced from the pivots of the upstream fins. The shut-off damper is tiltably arranged upstream of the upstream fins in the airflow passage. The operation knob is slidably provided on the downstream fin and includes a rotation member. The transmission shaft extends in a flowing direction of the air-conditioning air in the airflow passage and is arranged between the two central upstream fins. The upstream universal joint couples an upstream end of the transmission shaft to the shut-off damper. The downstream universal joint is located upstream of the pivot of the downstream fin and couples a downstream end of the transmission shaft to the rotation member. The transmission mechanism portion is provided between the two central upstream fins. The transmission mechanism portion transmits swinging motion of the transmission shaft caused by sliding of the operation knob to the central upstream fins, and prevents swinging motion of the transmission shaft caused by operation of the operation knob to tilt the downstream fin from being transmitted to the central upstream fins.

BRIEF DESCRIPTION OF THE DRAWINGS

FIG. 11A is an enlarged cross-sectional side view of a part of FIG. 7.

FIG. 11B is a partial cross-sectional side view of the air-conditioning register when an upward force is applied to the operation knob in the state shown in FIG. 11A.

FIG. 12A is an enlarged cross-sectional plan view of a part of FIG. 6.

FIG. 12B is a partial cross-sectional plan view of the air-conditioning register when a rightward force is applied to the operation knob in the state shown in FIG. 12A.

FIG. 14 is a perspective view, with part cut away, illustrating the main portion of a conventional air-conditioning register.

DETAILED DESCRIPTION OF THE PREFERRED EMBODIMENTS

First Embodiment

An air-conditioning register for a vehicle according to a first embodiment will now be described with reference to FIGS. 1 to 12B.

In the following description, the direction in which the vehicle advances (moves forward) will be referred to as the front, and the reverse direction will be referred to as the rear. The height direction of the vehicle will be referred to as a vertical direction of the vehicle. The width direction (the lateral direction) of the vehicle is defined with reference to the state in which the vehicle is viewed from the rear.

In the passenger compartment, the instrument panel is located in front of the front seats of the vehicle (the driver's seat and the front passenger seat). The instrument panel incorporates air-conditioning registers at the center and the sides with reference to the lateral direction (the vehicle width direction). The main functions of the air-conditioning registers are to change the direction of air-conditioning air that is delivered from the air conditioner and discharged through the outlets and to adjust the amount of discharged air. The function of adjusting the discharge amount includes stopping the air discharge.

Figure 1:
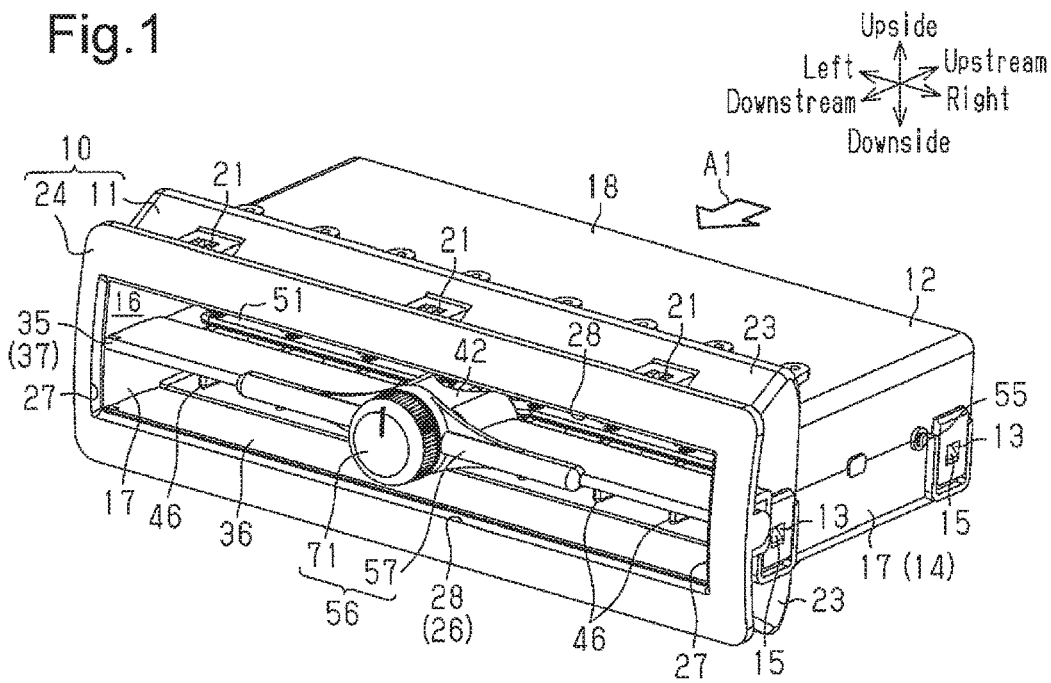
FIG. 1 is a perspective view of an air-conditioning register according to a first embodiment.
Figure 2:
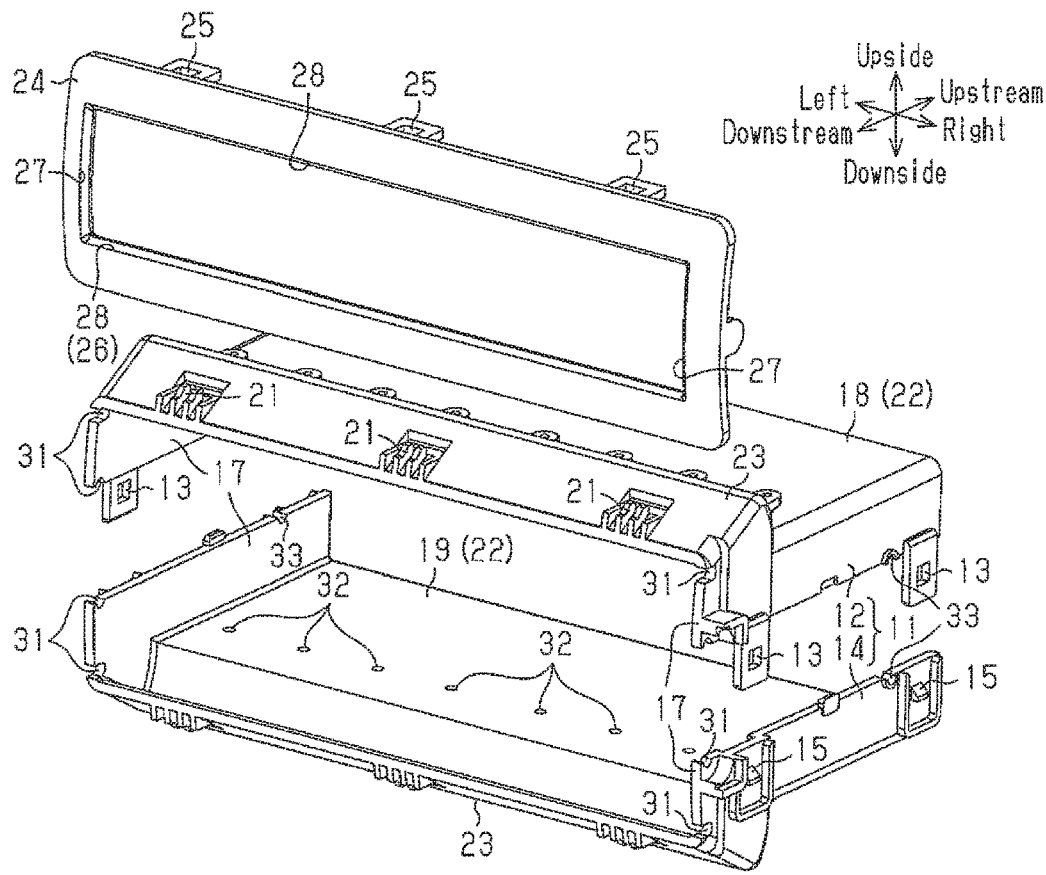
FIG. 2 is an exploded perspective view showing some of the components of the air-conditioning register of the first embodiment.
Figure 3:
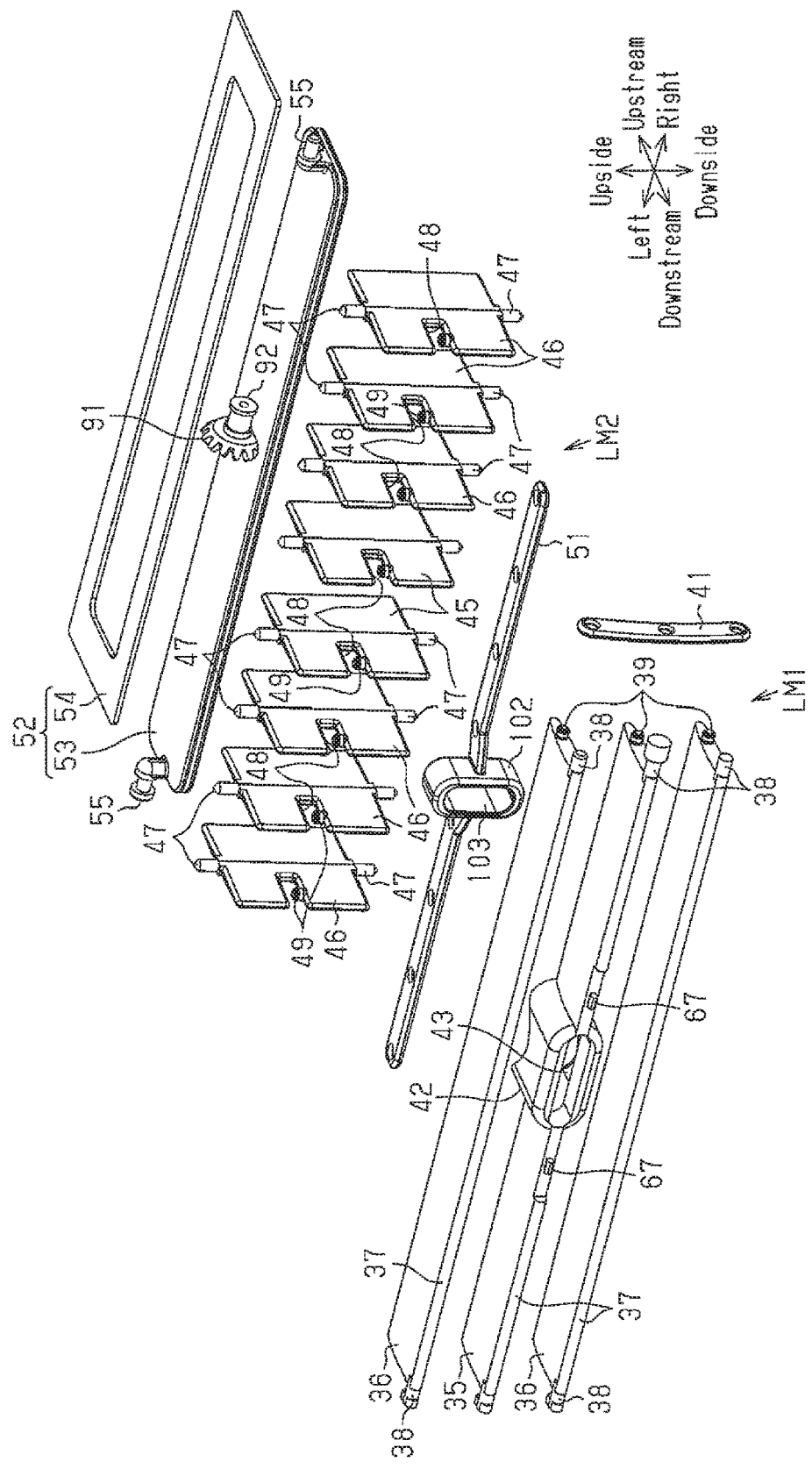
FIG. 3 is an exploded perspective view showing some of the components of the air-conditioning register of the first embodiment.

As shown in FIGS. 1 to 3, the air-conditioning register includes a retainer 10, a downstream fin set, an upstream fin set, a shut-off damper 52, and an operation knob 56. The structure of each component constituting the air-conditioning register will now be described.

<Retainer 10>

As shown in FIGS. 1 and 2, the retainer 10 is configured to connect the duct (not shown) of the air conditioner to the opening (not shown) in the instrument panel and includes a retainer body 11 and a bezel 24.

Figure 6:
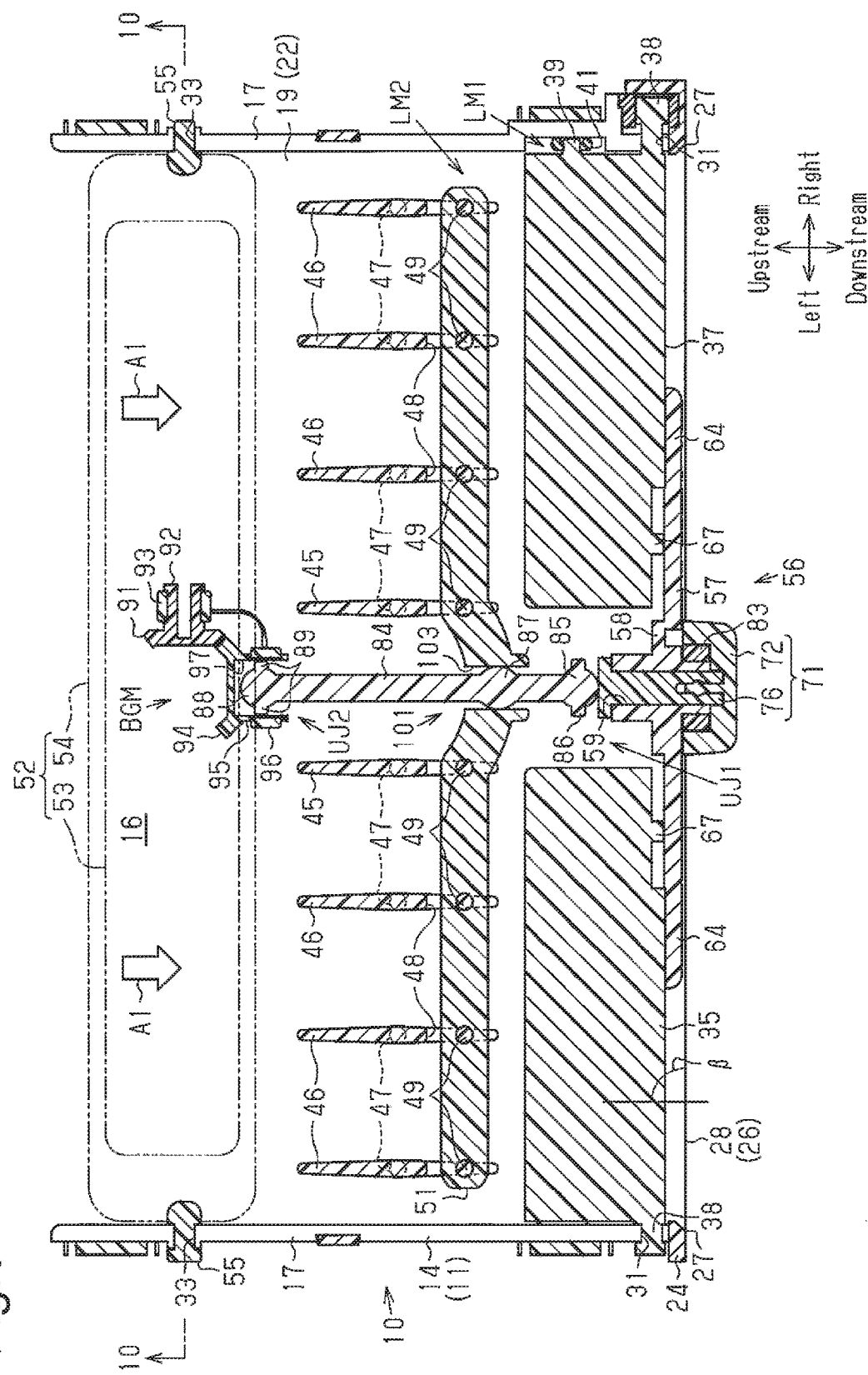
FIG. 6 is a cross-sectional view taken along line 6-6 of FIG. 5.

The interior space of the retainer 10 constitutes a passage for air-conditioning air A1, which is an airflow passage 16 (refer to FIG. 6). With regard to the direction in which the air-conditioning air A1 flows, the side closer to the air conditioner is referred to as "upstream," or "upstream side," and the side farther from the air conditioner will be referred to as "downstream," or "downstream side."

The retainer body 11 includes an upper body member 12 constituting the upper half and a lower body member 14 constituting the lower half. The upper body member 12 has securing holes 13 on either side in the lateral direction. The lower body member 14 has securing projections 15 on either side in the lateral direction at locations corresponding to the securing holes 13. The upper body member 12 is coupled to the lower body member 14 by engaging the securing projections 15 with the securing holes 13. The thusly formed retainer body 11 is substantially shaped like a rectangular tube with open upstream and downstream ends. The lateral dimension of the retainer body 11 is greater than the vertical dimension.

The airflow passage 16 is surrounded by four walls of the retainer body 11. These four walls include two side walls 17, which face each other in the lateral direction, and an upper wall 18 and a bottom wall 19, which face each other in the vertical direction.

Figure 5:
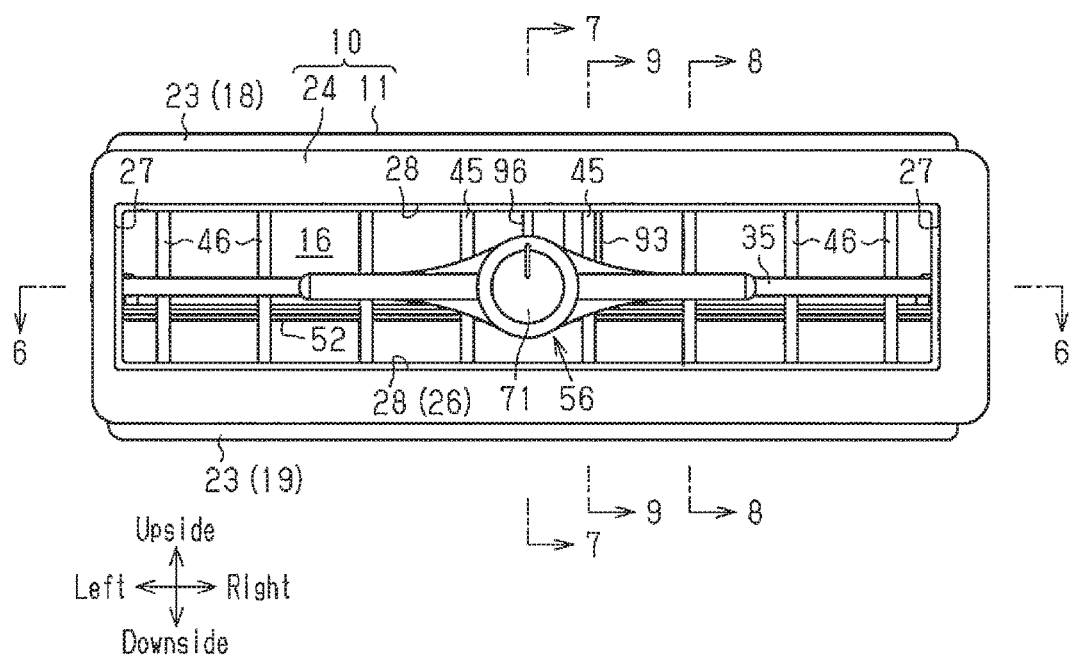
FIG. 5 is a front view of the air-conditioning register according to the first embodiment.

The bezel 24 constitutes the most downstream part of the retainer 10. The bezel 24 has securing holes 25 at several locations at the top and the bottom. The upper wall 18 and the bottom wall 19 have securing projections 21 at locations corresponding to the securing holes 25. The bezel 24 is coupled to the retainer body 11 by securing the securing projections 21 to the securing holes 25. As shown in FIG. 5, the bezel 24 has an outlet 26 at the downstream end of the airflow passage 16. The air-conditioning air A1 is blown out through the outlet 26. The end face on the downstream side of the bezel 24 about the outlet 26 constitutes a design surface of the air-conditioning register.

Figure 8:
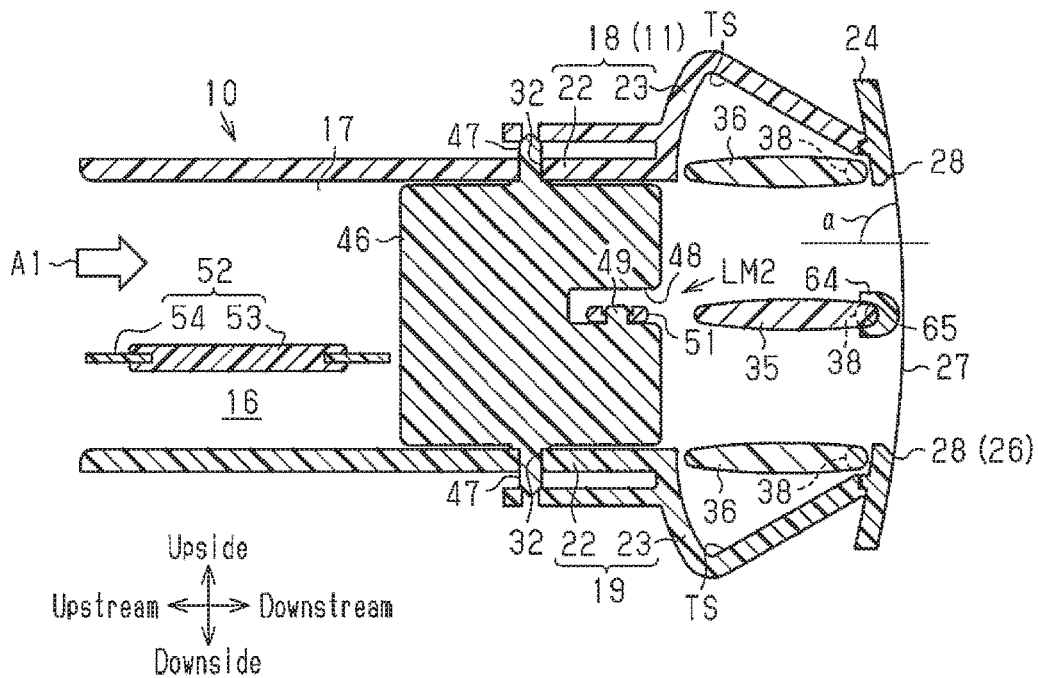
FIG. 8 is a cross-sectional view taken along line 8-8 of FIG. 5.

The outlet 26 includes two short side portions 27, which extend vertically, and long side portions 28, which extend laterally and are longer than the short side portions 27. As shown in FIG. 6, the short side portions 27 are located downstream of the side walls 17. As shown in FIG. 8, the long side portions 28 are located downstream of the upper and bottom walls 18, 19. The outlet 26 of this structure is shaped as a rectangle that is longer in the lateral direction than in the vertical direction.

Figure 7:
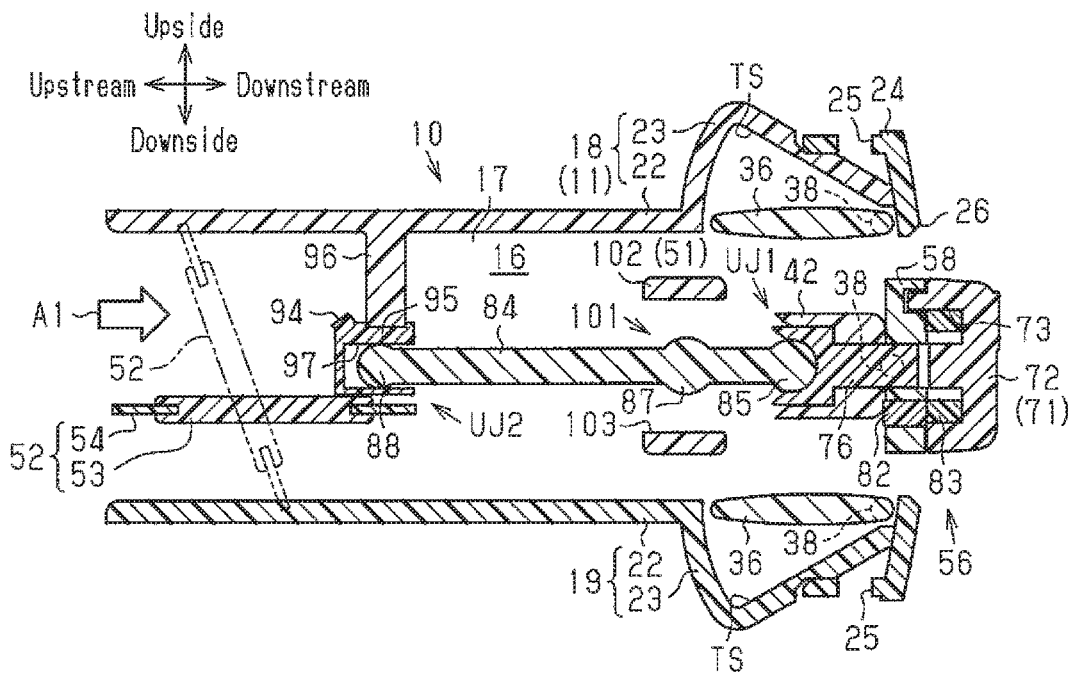
FIG. 7 is a cross-sectional view taken along line 7-7 of FIG. 5.

As shown in FIG. 7, most of the upper wall 18 and the bottom wall 19, except for the downstream portion, are constituted by flat wall portions 22. The flat wall portions 22 are parallel with each other. The downstream portion of the upper wall 18 is constituted by a bulging wall 23 bulging upward from the airflow passage 16. The downstream portion of the bottom wall 19 is constituted by a bulging wall 23 bulging downward from the airflow passage 16. The interior spaces of the upper and lower bulging walls 23 constitute spaces TS that allow the downstream fins 36 discussed below to tilt to the upper side or the lower side of the airflow passage 16 relative to the flat wall portions 22.

As shown in FIGS. 2 and 6, the retainer body 11 has two bearing portions 31 between the bezel 24 and each of the left and right side walls 17. The bearing portions 31 in each of the side walls 17 are spaced apart in the vertical direction. These bearing portions 31 are located close to the upper wall 18 or the bottom wall 19 and located upstream of the peripheral portion of the outlet 26 in the bezel 24. The bearing portions 31 are also provided at the downstream ends of the side walls 17 at the boundary between the upper body member 12 and the lower body member 14. These bearing portions 31 are located at center portions between the upper and lower bearing portions 31.

As shown in FIGS. 2 and 8, each of the flat wall portions 22 of the upper wall 18 and the bottom wall 19 have bearing portions 32, which are located upstream of the bearing portions 31 and spaced apart in the lateral direction. Further, each side wall 17 has a bearing portion 33, which is located upstream of the bearing portions 32 and at the boundary between the upper body member 12 and the lower body member 14 (see FIG. 6).

<Downstream Fin Set>

As shown in FIGS. 3 and 8, the downstream fin set is constituted by multiple downstream fins. More specifically, in the present embodiment, the downstream fin set is constituted by three downstream fins. The downstream fins are used to change the angle α with respect to the short side portions 27 of the air-conditioning air A1 blown out from the outlet 26. To distinguish the three downstream fins, the one at the center in the arrangement direction (the vertical direction) will be referred to as a downstream fin 35, and the fins above and below the downstream fin 35 will be referred to as downstream fins 36. The downstream fins 36 have an identical structure. The downstream fins 35, 36 are mainly constituted by plate-shaped members, which extend in the lateral direction along the long side portions 28.

Each of the downstream fins 35, 36 has pivots 38 on the end faces in the lateral direction. The pivots 38 extend in the lateral direction. The pivots 38 are positioned at the downstream end of the downstream fins 35, 36 in the flowing direction of the air-conditioning air A1. The pivots 38 of the downstream fins 35, 36 are supported by the side walls 17 with the bearing portions 31 (see FIG. 6).

A downstream edge 37 of each of the downstream fins 35, 36 linearly extends in the lateral direction along the pivots 38 (see FIG. 6).

As shown in FIGS. 3 and 6, each of the downstream fins 35, 36 has a coupling pin 39 at a section displaced upstream from the right pivot 38. The coupling pin 39 extends in parallel with the pivot 38. The coupling pins 39 of the downstream fins 35, 36 are coupled together by a coupling rod 41 extending in the vertical direction. The coupling pins 39 and the coupling rod 41 constitute a link mechanism LM1, which mechanically couples the downstream fin 35 and the downstream fins 36 to each other, and tilts the downstream fins 36 in synchronization with the downstream fin 35 so that the downstream fins 36 have the same inclination as that of the downstream fin 35.

As shown in FIGS. 3 and 7, the downstream fin 35 has a tubular portion 42 at the center in the lateral direction. The tubular portion 42 is integrated with the downstream fin 35 and extends in the flowing direction of the air-conditioning air A1. The upstream end and the downstream end of the tubular portion 42 are open. The tubular portion 42 has a flattened shape such that the lateral dimension is greater than the vertical dimension. As shown in FIG. 11A, the tubular portion 42 has fitting portions 43 at the upstream portions in the upper and lower inner walls at the center in the lateral direction. The fitting portions 43 each have an arcuate shape when viewed from front.

<Upstream Fin Set>

As shown in FIGS. 3, 6, and 8, the upstream fin set is constituted by multiple upstream fins arranged on the upstream side of the downstream fin set in the airflow passage 16. The upstream fins are used to change the angle β with respect to the long side portions 28 of the air-conditioning air A1 blown out from the outlet 26. The upstream fins are each constituted by a plate-shaped member, which extends in the vertical direction and in the flowing direction of the air-conditioning air A1. The upstream fins are arranged to be substantially parallel with each other, while being spaced apart in the lateral direction.

To distinguish the upstream fins, the adjacent ones at the center in the lateral direction will be referred to as central upstream fins 45, and the remaining ones will be referred to as upstream fins 46. When there is no need to distinguish the upstream fins, these will be collectively referred to as the upstream fins 45, 46 in some cases.

Each of the upstream fins 45, 46 has pivots 47 on the end faces in the vertical direction. The pivots 47 extend in the vertical direction. The respective pivots 47 are substantially positioned at the centers of the upstream fins 45, 46 in the flowing direction of the air-conditioning air A1. The pivots 47 of the upstream fins 45, 46 are tiltably supported by the upper wall 18 and the bottom wall 19 with the bearing portions 32 (see FIG. 9).

Each of the upstream fins 45, 46 has a cutout portion 48 and a coupling pin 49. The respective cutout portions 48 are positioned at the downstream portions of the upstream fins 45, 46 in the flowing direction of the air-conditioning air A1. Also, the respective cutout portions 48 are positioned at the center of the upstream fins 45, 46 in the vertical direction. The coupling pin 49 is located on the lower surface of each cutout portion 48 and protrudes upward from a section displaced downstream from the pivots 47. The coupling pins 49 of the upstream fins 45, 46 are coupled together by a coupling rod 51 extending in the lateral direction. The coupling pins 49 and the coupling rod 51 constitute a link mechanism LM2, which tilts all the upstream fins 45, 46 in synchronization so that the all the upstream fins 45, 46 have the same inclination.

<Shut-Off Damper 52>

As shown in FIGS. 3, 6, and 7, the shut-off damper 52 is located in the retainer 10 at a location upstream of the upstream fin set to selectively open and close the airflow passage 16. The shut-off damper 52 includes a rectangular damper plate 53, which is longer in the lateral direction than in the flowing direction of the air-conditioning air A1, and a sealing member 54 attached to the periphery of the damper plate 53.

The damper plate 53 has pivots 55 extending in the lateral direction at the opposite ends in the lateral direction. The shut-off damper 52 is supported by the side walls 17 with the pivots 55 at the bearing portions 33 to be tiltable between the open position and the closed position. In the open position, the shut-off damper 52 is substantially at the center between the upper and lower flat wall portions 22 as indicated by the solid lines in FIG. 7. In this position, the shut-off damper 52 is substantially parallel with the flat wall portions 22 to largely open the airflow passage 16. In the closed position, the shut-off damper 52 is largely inclined relative to the flat wall portions 22 as indicated by the long dashed double-short dashed lines in FIG. 7. In this state, the shut-off damper 52 contacts the inner wall surfaces of the retainer 10 at the sealing member 54 to close the airflow passage 16.

<Operation Knob 56>

Figure 4:
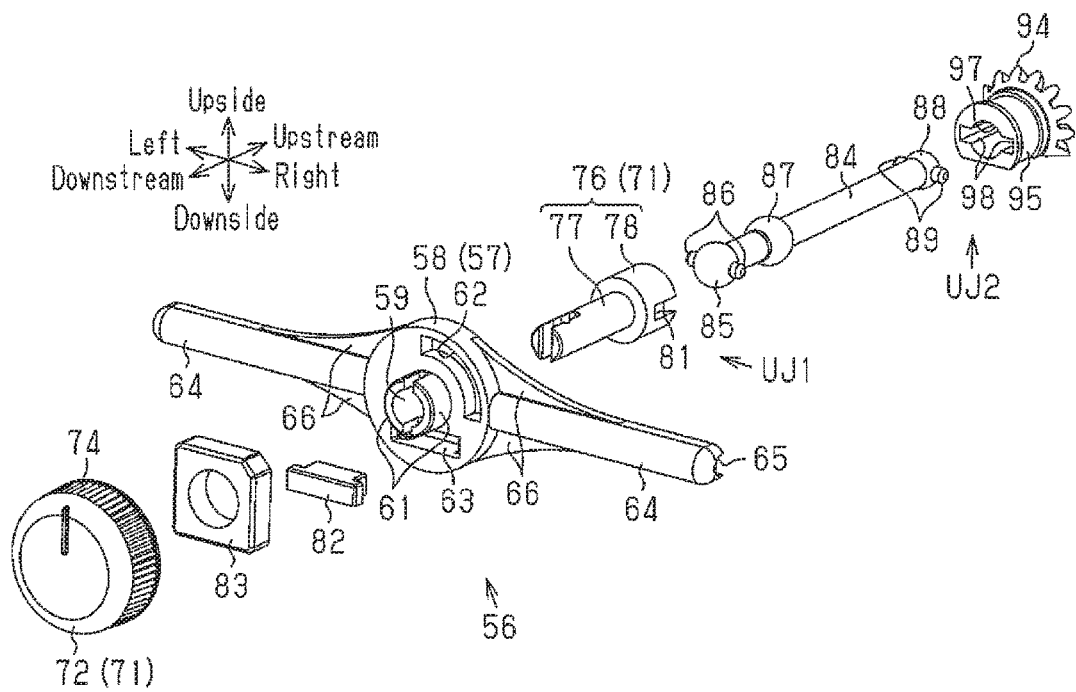
FIG. 4 is an exploded perspective view showing some of the components of the air-conditioning register of the first embodiment.

As shown in FIGS. 4, 11A, and 12A, the operation knob 56 is a member operated by an occupant to tilt the downstream fins 35, 36, the upstream fins 45, 46, and the shut-off damper 52, independently. The operation knob 56 includes a knob body 57 and a rotation member 71.

The knob body 57 has a disk-shaped base 58 at the center in the lateral direction. The base 58 has a central hole 59 at the center. The central hole 59 extends in the flowing direction of the air-conditioning air A1. The base 58 has a pair of protrusions 61 at the downstream end face about the central hole 59. The protrusions 61 are provided along the periphery of the central hole 59 and protrude in the downstream direction.

The base 58 has a groove 62 and an attachment hole 63 about the protrusions 61. The groove 62 opens in the downstream end face of the base 58 and is curved along the periphery of the central hole 59. The attachment hole 63 has a horizontally elongated shape and extends through the base 58 in the flowing direction of the air-conditioning air A1.

The knob body 57 has a pair of rod-shaped arms 64 on the opposite sides. The arms 64 extend in the lateral direction. Each arm 64 has an attachment groove 65 (FIG. 8), which opens in the upstream end face and extends in the lateral direction. Reinforcing ribs 66 (FIG. 9) are provided at the boundaries between the base portion 58 and the arms 64.

The knob body 57, which has the above-described configuration, is arranged on the downstream side of the downstream fin 35 such that the base 58 faces the tubular portion 42, and that the arms 64 face the left and right side portions of the tubular portion 42 of the downstream fin 35. Further, the knob body 57 is attached to the side portions of the downstream fin 35 at the arms 64 so as to be slidable in the lateral direction. The attachment is achieved by fitting the side portions of the downstream fin 35 to the attachment grooves 65 of the arms 64 from the upstream side.

As shown in FIGS. 3 and 6, the downstream fin 35 has securing projections 67 at the downstream end on the left and right sides of the tubular portion 42. The securing projections 67 are engaged with securing grooves (not shown) in the arms 64, so that the knob body 57 is prevented from falling off the downstream fin 35.

As shown in FIGS. 4, 11A, and 12A, the rotation member 71 includes a knob portion 72 and a shaft portion 76. The knob portion 72 is shaped as a disk with an outer diameter equivalent to that of the base 58. The knob portion 72 is arranged on the downstream side of the base 58 with the central axis aligned with the central axis of the base 58. The knob portion 72 has a recess 73 that opens on the upstream end face and receives the protrusions 61 of the base 58. The knob portion 72 has a circumferential wall 74 surrounding the recess 73 and a projecting portion 75 (refer to FIG. 11A), which projects upstream from the circumferential wall 74. The projecting portion 75 is engaged with the groove 62 of the base 58. The projecting portion 75 orbits about the central hole 59 in the groove 62 when the knob portion 72 is rotated. In other words, the orbiting motion of the projecting portion 75 is permitted only in the groove 62. When abutting against an end wall in the circumferential direction in the groove 62, the projecting portion 75 is restricted from orbiting further. In this manner, the knob portion 72 is configured to be rotated in a predetermined angular range.

The shaft portion 76 includes a shaft body 77, which extends in the flowing direction of the air-conditioning air A1, and an outer portion 78, which is on the upstream side of and integrated with the shaft body 77. The shaft body 77 is inserted through the tubular portion 42 and is rotationally inserted into the central hole 59 of the base 58 and is coupled to the knob portion 72 at the downstream portion to be integrally rotational with the knob portion 72.

The outer portion 78 has a substantially cylindrical shape with a diameter larger than that of the shaft body 77 and is located inside the tubular portion 42 of the downstream fin 35 at a location upstream of the base 58. More specifically, the outer portion 78 is located at a location separated away upstream from the pivots 38 of the downstream fin 35. The outer portion 78 is slidably fitted into the upper and lower fitting portions 43 of the tubular portion 42. The outer portion 78 has an engagement recess 79, which opens at the upstream end face and has a spherical inner surface. The outer portion 78 has two transmission recesses 81 (refer to FIG. 4) at the upstream end. The transmission recesses 81 extend away from each other in the radial direction of the engagement recess 79.

As shown in FIG. 11A, an elastic member 82 is fitted in the attachment hole 63 of the base 58. The elastic member 82 elastically contacts the tubular portion 42 of the downstream fin 35 from the downstream side. Through this contact, sliding motion of the operation knob 56 generates a sliding resistance between the elastic member 82 and the downstream fin 35 (the tubular portion 42), so that an adequate operational load is generated. An elastic member 83 is fitted in the recess 73 of the knob portion 72 around the protrusions 61. The elastic member 83 elastically contacts the protrusions 61. Through this contact, rotation of the knob portion 72 generates a sliding resistance between the elastic member 83 and the protrusions 61, and an adequate operational load is generated.

Further, in order to transmit movements of the operation knob 56 to the downstream fin 35, the central upstream fins 45, and the shut-off damper 52, respectively, and to tilt these, the following configurations are employed. A transmission shaft 84 is provided to extend between two of the upstream fins that located at the center in the lateral direction. Specifically, the transmission shaft 84 is located between the central upstream fins 45 and extends in the flowing direction of the air-conditioning air A1. The transmission shaft 84 is located in the vicinity of the coupling rod 51.

The downstream end of the transmission shaft 84 is coupled to the rotation member 71 with a downstream universal joint UJ1. More specifically, as shown in FIG. 4, a spherical engagement portion 85 is provided at the downstream end of the transmission shaft 84. The engagement portion 85 has two transmission pins 86, which extend away from each other in the radial direction from the opposite sides. As shown in FIG. 11A, the engagement portion 85 is slidably engaged with the outer portion 78 in a state where the outer surface of the engagement portion 85 is in contact with the spherical inner surface of the engagement recess 79. The transmission pins 86 of the engagement portion 85 are engaged with the transmission recesses 81 of the outer portion 78. The outer portion 78 and the engagement portion 85 constitute the downstream universal joint UJ1.

Figure 9:
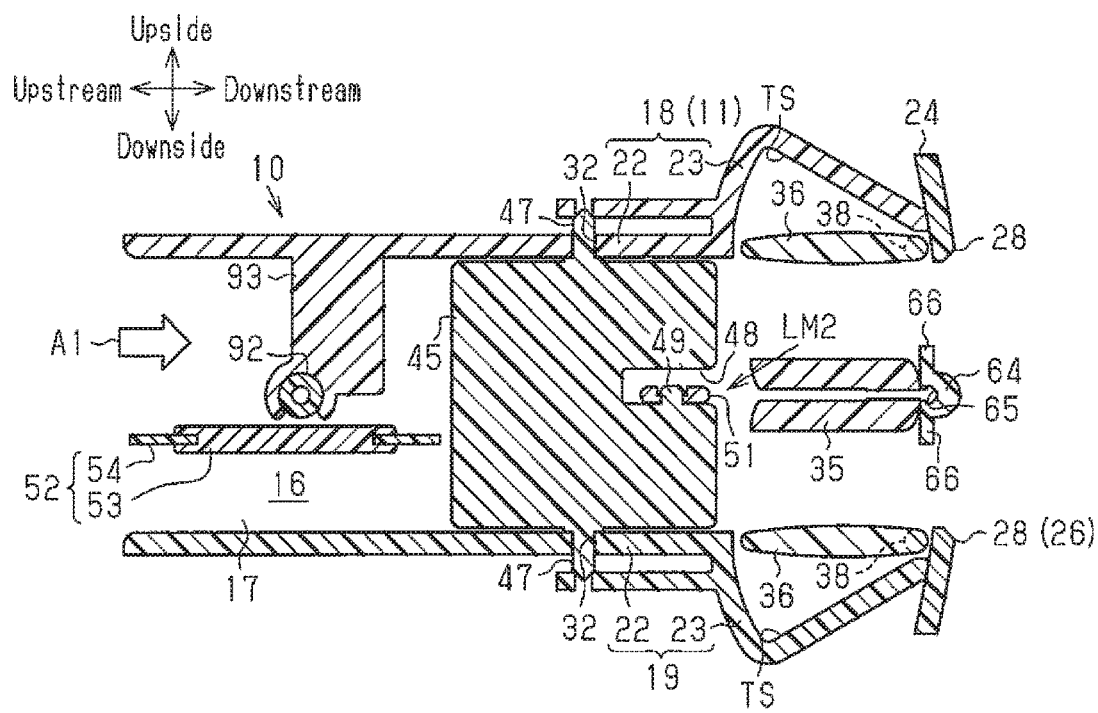
FIG. 9 is a cross-sectional view taken along line 9-9 of FIG. 5.
Figure 10:
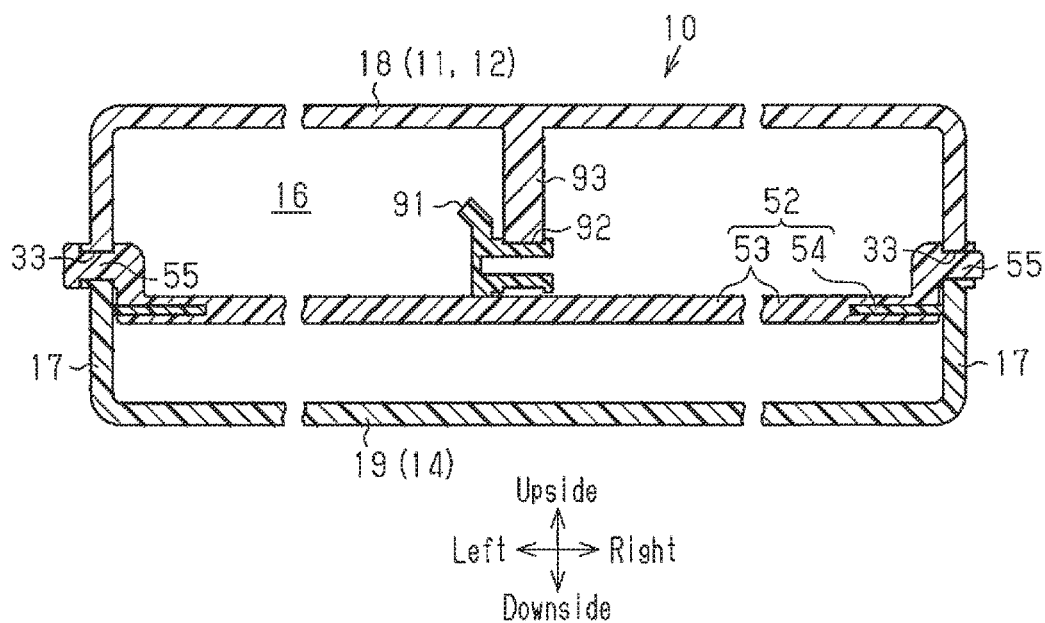
FIG. 10 is a cross-sectional view taken along line 10-10 of FIG. 6, and from which some parts omitted.

The upstream end of the transmission shaft 84 is coupled to the shut-off damper 52 via a bevel gear mechanism BGM. The bevel gear mechanism BGM is configured to transmit rotation of the transmission shaft 84, which extends in a direction different from the pivots 55 of the shut-off damper 52, to the shut-off damper 52. The bevel gear mechanism BGM includes a driven-side bevel gear 91 (refer to FIG. 3) provided on the shut-off damper 52 and a driving-side bevel gear 94 meshed with the driven-side bevel gear 91. As shown in FIG. 3, the driven-side bevel gear 91 is integrally formed with the damper plate 53 of the shut-off damper 52. The driven-side bevel gear 91 includes a shaft 92, which extend in the lateral direction. As shown in FIGS. 9 and 10, the shaft 92 is rotationally supported by a support portion 93 suspended from the upper wall 18 of the retainer 10. The driving-side bevel gear 94 includes an outer portion 95, which extends in the flowing direction of the air-conditioning air A1. The outer portion 95 has a substantially cylindrical shape with a closed upstream end and an open downstream end. As shown in FIGS. 11A and 11B, the outer portion 95 is rotationally supported by a support portion 96 extending downward from a location in the upper wall 18 close to the support portion 93.

The interior space of the outer portion 95 constitutes an engagement recess 97 having a cylindrical inner surface. As shown in FIG. 4, the outer portion 95 has two engagement grooves 98 in the inner surface of the engagement recess 97 on the opposite sides of the central axis. The engagement grooves 98 extend along the central axis (refer to FIG. 4).

The transmission shaft 84 has a spherical engagement portion 88 at the upstream end. The engagement portion 88 has two transmission pins 89, which extend away from each other in the radial direction from the opposite sides. The engagement portion 88 is slidably engaged with the outer portion 95 in a state where the outer surface of the engagement portion 88 is in contact with the cylindrical inner surface of the engagement recess 97. The two transmission pins 89 are engaged with the engagement grooves 98 of the outer portion 95. The outer portion 95 and the engagement portion 88 constitute an upstream universal joint UJ2. The upstream universal joint UJ2 allows the transmission shaft 84 to pivot relative to the outer portion 95 about the spherical engagement portion 88. Further, rotation of the transmission shaft 84 is transmitted to the driving-side bevel gear 94 by means of the transmission pins 89 of the engagement portion 88. Further, the transmission pins 89 are movable in the flowing direction of the air-conditioning air A1 along the engagement grooves 98.

The portion of the transmission shaft 84 located between the central upstream fins 45 and the portion of the coupling rod 51 located between the central upstream fins 45 constitute a transmission mechanism portion 101, which has the following first and second functions. The first function is to transmit, to the two central upstream fins 45, swinging motion in the lateral direction of the transmission shaft 84 about the engagement portion 88 of the transmission shaft 84 caused by sliding motion of the operation knob 56. The second function is to prevent vertical swinging motion of the transmission shaft 84 about the engagement portion 88 caused by operation of the operation knob 56 to tilt the downstream fin 35 from being transmitted to the central upstream fins 45.

As shown in FIGS. 3, 11A, and 12A, a transmission portion 102 having a transmission hole 103 is integrally formed in a portion of the coupling rod 51 located between the two central upstream fins 45. The transmission hole 103 extends through the transmission portion 102 in the flowing direction of the air-conditioning air A1. The transmission portion 102 is indirectly coupled to the central upstream fins 45 by part of the coupling rod 51 to transmit force. The transmission shaft 84 is inserted in the transmission hole 103 at the intermediate portion in the length direction thereof and at a section close to the engagement portion 85. The transmission shaft 84 has a spherical contactor (or contacting portion) 87 having a diameter larger than the diameter of the transmission shaft 84 at the part inserted in the transmission hole 103.

The transmission hole 103 has a vertically elongated shape. This configuration is employed to allow the inner wall surfaces of the transmission hole 103 to transmit swinging motion of the transmission shaft 84 to the transmission portion 102 only when the transmission shaft 84 swings in the lateral direction about the upstream end as the operation knob 56 is slid.

More specifically, the dimension of the transmission hole 103 in the direction along the pivots 38 of the downstream fin 35 (the lateral direction) is set to a size that satisfies the following condition 1. Also, the dimension of the transmission hole 103 in the direction along the pivots 47 of the upstream fins 45, 46 (the vertical direction) is set to a size that satisfies the following condition 2.

Condition 1: The dimension in the lateral direction of the transmission hole 103 is smaller than the dimension of the region in which the contactor 87 moves when the transmission shaft 84 swings in the lateral direction about the upstream end as the operation knob 56 is slid in a state in which the transmission portion 102 is absent.

In the first embodiment, the dimension of the transmission hole 103 in the lateral direction is set to be slightly larger than the diameter of the contactor 87.

Condition 2: The dimension in the vertical direction of the transmission hole 103 is greater than the dimension of the region in which the contactor 87 moves when the transmission shaft 84 swings in the vertical direction about the upstream end as the operation knob 56 is operated to tilt the downstream fin 35 in a state in which the transmission portion 102 is absent.

The transmission mechanism portion 101 is constituted by the transmission portion 102, which is provided on the coupling rod 51 and has the transmission hole 103, and the contactor 87 on the transmission shaft 84.

Operation and advantages of the first embodiment, which is configured as described above, will now be described.

The long dashed double-short dashed lines in FIG. 7 represent the state in which the shut-off damper 52 is arranged at the closed position. In this state, the airflow passage 16 is closed by the shut-off damper 52. The flow of the air-conditioning air A1 is blocked in the section of the airflow passage 16 that is downstream of the shut-off damper 52, so that the discharge of the air-conditioning air A1 from the outlet 26 is stopped.

In contrast, the solid lines in FIG. 7 represent the state in which the shut-off damper 52 is arranged at the open position. In this state, the airflow passage 16 is fully opened, so that the air-conditioning air A1 is divided into upper and lower streams in relation to the shut-off damper 52. After passing through the shut-off damper 52, the air-conditioning air A1 flows along the upstream fin set and the downstream fin set and is then blown out from the outlet 26.

Switching of the shut-off damper 52 from the closed position to the open position and switching from the open position to the closed position are performed through rotation of the knob portion 72 in the operation knob 56 as shown in FIGS. 11A and 12A. When the knob portion 72 is rotated by an occupant, the shaft portion 76 rotates together with the knob portion 72. The rotation of the shaft portion 76 is transmitted to the engagement portion 85 of the transmission shaft 84 via the transmission pins 86, which are engaged with the transmission recesses 81 of the outer portion 78 (refer to FIG. 4). The transmission shaft 84 rotates around the central axis thereof and the rotation thereof is transmitted to the outer portion 95 of the driving-side bevel gear 94 via the transmission pins 89 of the upstream engagement portion 88. The driving-side bevel gear 94 rotates in the same direction as the transmission shaft 84. The rotation is transmitted to the shut-off damper 52 via the driven-side bevel gear 91. At this time, the direction of the transmitted rotation is changed by the bevel gear mechanism BGM. When the shut-off damper 52 is tilted about the pivots 55, the opening degree of the shut-off damper 52 is changed. When the knob portion 72 is rotated until the projecting portion 75 abuts against one end wall in the circumferential direction of the groove portion 62, the shut-off damper 52 is arranged at the open position, and the airflow passage 16 is opened wide. When the knob portion 72 is rotated until the projecting portion 75 abuts against the other end wall in the circumferential direction of the groove portion 62, the shut-off damper 52 is arranged at the closed position, and the airflow passage 16 is closed.

As described above, by rotating the knob portion 72, it is possible to change the opening degree of the shut-off damper 52 and adjust the amount of the air-conditioning air A1 passing through the shut-off damper 52 in the airflow passage 16.

In addition, when the transmission shaft 84 is rotated as described above, the rotation is not transmitted to the central upstream fins 45. This is because the contactor 87 rotates in the transmission hole 103 as the transmission shaft 84 rotates, so that no force is transmitted between the contactor 87 and the transmission portion 102. Thus, the upstream fins 45, 46 are not tilted. Also, no force is transmitted between the transmission shaft 84 and the tubular portion 42. Thus, the downstream fins 35, 36 are not tilted, either.

In the following description, it is assumed that the shut-off damper 52 is arranged at the open position.

FIGS. 7 and 8 illustrate the neutral state of the air-conditioning register. In the neutral state, the upper and lower downstream fins 36 are arranged to be parallel with the upper and lower flat wall portions 22 at the boundaries between the spaces TS and the airflow passage 16. The central downstream fin 35 is also arranged to be parallel with the flat wall portions 22. The upper and lower downstream fins 36 are located on the upstream side of the peripheral parts of the outlet 26 in the bezel 24 and therefore hidden and inconspicuous. From the downstream side of the air-conditioning register, that is, from the passenger compartment, only the downstream fin 35 located at the center among the downstream fins 35, 36 is visible, and the appearance is favorable. In the neutral state, the upstream fins 45, 46 are arranged to be substantially parallel with the left and right side walls 17 (refer to FIG. 6).

Accordingly, after passing through the shut-off damper 52, the air-conditioning air A1 flows along the upstream fins 45, 46 and the side walls 17, then flows along the downstream fins 35, 36 to be blown out straight from the outlet 26.

At this time, each space TS is closed by the corresponding downstream fin 36 at the boundary with the airflow passage 16. Thus, only small amount of the air-conditioning air A1 flows into the spaces TS.

At this time, the operation knob 56 is located at the center in the lateral direction in the downstream fin 35. The rotation member 71 is located at the center in the lateral direction in the tubular portion 42. The central axis of the shaft portion 76 in the rotation member 71 is substantially parallel with the upper and lower flat wall portions 22 like the downstream fin 35. The transmission shaft 84 is substantially parallel with the flat wall portions 22 and the side walls 17.

When a force in the vertical direction, or in a direction along the pivots 47 of the upstream fins 45, 46, for example, an upward force is applied to the operation knob 56 in the neutral state, the downstream fin 35 is tilted counterclockwise about the pivots 38 as viewed in FIG. 11B. The tilting motion is transmitted to the downstream fins 36 via the link mechanism LM1 (refer to FIGS. 3 and 6). This tilts the downstream fins 36 counterclockwise about the pivots 38 as viewed in FIG. 11B in synchronization with the central downstream fin 35. The operation knob 56 and the downstream fins 35, 36 become inclined to ascend toward the downstream ends. Particularly, the lower downstream fin 36 entirely enters the lower space TS to be inclined.

When flowing along the tilted downstream fins 35, 36 as described above, the air-conditioning air A1 changes its direction and blows out obliquely upward from the outlet 26. The angle α (refer to FIG. 8) with respect to the short side portions 27 of the air-conditioning air A1 is larger than that in the neutral state.

It is now assumed that the pivots 38 of the downstream fins 35, 36 are located upstream of the downstream ends in the flowing direction of the air-conditioning air A1. In this state, when the downstream fins 35, 36 are tilted so that portions downstream of the pivots 38 are inclined, the inclined portions downstream of the pivots 38 are visible from the downstream side of the air-conditioning register (from the passenger compartment), which degrades the appearance. Further, if the pivots 38 are provided at the opposite ends in the lateral direction of the downstream fins 35, 36 at the downstream ends in the flowing direction of the air-conditioning air A1, and the downstream edges 37 of the downstream fins 35, 36 are curved to bulge toward the downstream side, the same appearance problem will arise. Specifically, although being curved, the downstream fins 35, 36 have parts located downstream of the pivots 38. Thus, when the downstream fins 35, 36 are tilted, these downstream parts will be visible from the downstream side (from the passenger compartment).

In contrast, in the first embodiment, the downstream fins 35, 36 have no curved parts. That is, the downstream edges 37 extend linearly in the lateral direction, which is the direction in which the pivots 38 extend. The pivots 38 are located at the downstream ends of the downstream fins 35, 36. Thus, the downstream fins 35, 36 do not have parts that are located downstream of the pivots 38 and would appear inclined. The appearance is therefore favorable.

Such effects are particularly advantageous when two or more air-conditioning registers are respectively incorporated in the instrument panel at multiple locations in the lateral direction. It is assumed that two adjacent air-conditioning registers are provided in which the pivots 38 of the downstream fins 35, 36 are located at locations upstream of the downstream ends in the flowing direction of the air-conditioning air A1. In this case, if the tilting direction of the downstream fins 35, 36 in one of the air-conditioning register is different from that in the other air-conditioning register, the vertical positions of the inclined parts downstream of the pivots 38 are uneven. This further deteriorates the appearance when two or more air-conditioning registers are viewed from the downstream side (from the passenger compartment).

In this respect, according to the first embodiment, the vertical positions of the downstream edges 37 of the downstream fins 35, 36 would be the same in the two adjacent air-conditioning registers. Therefore, the appearance of the air-conditioning registers as viewed from the downstream side (from the passenger compartment) is improved.

The downstream universal joint UJ1 looks like a mass and thus can degrade the appearance. Particularly, the closer to the downstream end of the downstream fin 35 the downstream universal joint UJ1 is, the stronger the tendency of such appearance deterioration becomes. This is because the mass that is the downstream universal joint UJ1 is conspicuous when the air-conditioning register is viewed from the downstream side.

However, in the first embodiment, as described above, the downstream universal joint UJ1, that is, the engagement portion 85 and the outer portion 78 are located upstream of the pivots 38 of the downstream fin 35. Therefore, the degree of deterioration of the appearance by the downstream universal joint UJ1 is reduced as compared with the case where the downstream universal joint UJ1 is positioned on the same line as the pivots 38 of the downstream fin 35.

Tilting motion of the operation knob 56 is transmitted to the transmission shaft 84 via the downstream universal joint UJ1 on the upstream side of the pivots 38 of the downstream fin 35. Therefore, the transmission shaft 84 swings vertically about the upstream universal joint UJ2, more specifically, about the spherical engagement portion 88, which is engaged with the outer portion 95 of the bevel gear 94. For example, when an upward force is applied to the operation knob 56 as described above, the shaft portion 76 is inclined to descend toward the upstream end. Thus, the transmission shaft 84 swings downward about the engagement portion 88. Consequentially, the transmission shaft 84 is inclined to descend toward the downstream end.

However, between the two central upstream fins 45, the swinging motion of the transmission shaft 84 is not transmitted to the central upstream fins 45 by the transmission mechanism portion 101, which is constituted by the transmission shaft 84 and the coupling rod 51. This is because the vertical dimension of the transmission hole 103 is set to a size that satisfies the condition 2, so that the contactor 87 of the transmission shaft 84 moves downward in the transmission hole 103 in accordance with the swinging motion, and force is not transmitted between the contactor 87 and the transmission portion 102. The upper and lower inner wall surfaces of the transmission hole 103 contact neither the contactor 87 nor the portion of the transmission shaft 84 different from the contactor 87. As a result, none of the upstream fins 45, 46 are tilted.

Further, when a force directed in the lateral direction, which is a direction along the pivots 38 of the downstream fin 35, for example, a rightward force, is applied to the operation knob 56 in the neutral state, the operation knob 56 is slid rightward together with the rotation member 71 and the downstream universal joint UJ1. This swings the transmission shaft 84 rightward about the spherical engagement portion 88.

Between the two central upstream fins 45, the swinging motion of the transmission shaft 84 is transmitted to the central upstream fins 45 by the transmission mechanism portion 101, which is constituted by the transmission shaft 84 and the coupling rod 51. This is because the lateral dimension of the transmission hole 103 is set to a size that satisfies the condition 1, so that the contactor 87 of the transmission shaft 84 contacts the left and right inner wall surfaces of the transmission hole 103 in accordance with the swinging motion, and force is transmitted between the contactor 87 and the transmission portion 102. This moves the transmission portion 102 rightward together with the other part of the coupling rod 51. This motion is transmitted to the central upstream fins 45 and to the upstream fins 46. As a result, the central upstream fins 45 and all the upstream fins 46 are tilted counterclockwise as viewed in FIG. 12B about the respective pivots 47.

At this time, the left and right inner wall surfaces of the transmission hole 103 do not contact parts of the transmission shaft 84 other than the contactor 87. When flowing along the tilted upstream fins 45, 46 as described above, the air-conditioning air A1 changes its direction and blows out rightward from the outlet 26. The angle β (refer to FIG. 6) with respect to the long side portions 28 of the air-conditioning air A1 is larger than that in the neutral state.

The above is the operation when the operation knob 56 is tilted or slid from the neutral state as a reference. However, when the operation knob 56 is tilted or slid from a state different from the neutral state, the respective parts of the air-conditioning register operate in the same manner as described above. Further, the knob portion 72 of the rotation member 71 can be rotated to tilt the shut-off damper 52 even if the upstream fins 45, 46 are inclined with respect to the side walls 17, or even if the downstream fins 35, 36 are inclined with respect to the flat wall portions 22. This is because the downstream end of the transmission shaft 84 is coupled to the rotation member 71 with the downstream universal joint UJ1, and the upstream end is coupled to the shut-off damper 52 with the upstream universal joint UJ2. Therefore, force is transmitted even if the central axis of the transmission shaft 84 intersects with the central axis of the rotation member 71. Also, force is transmitted even if the central axis of the transmission shaft 84 intersects with the central axis of the outer portion 95.

As described above, by operating the operation knob 56, which has the rotation member 71, the downstream fins 35, 36, the upstream fins 45, 46, and the shut-off damper 52 can be tilted independently. Therefore, unlike the case in which the rotation member 71 is provided at a location different from the operation knob 56, there is no need to separately provide an installation space for the rotation member 71.

Further, the transmission shaft 84 is located between two adjacent ones of the upstream fins at the center, that is, between the central upstream fins 45. Further, the transmission mechanism portion 101, which is constituted by the coupling rod 51 and the transmission shaft 84, is provided between the central upstream fins 45. The transmission mechanism portion 101 selectively transmits and blocks swinging motion of the transmission shaft 84 to the central upstream fins 45.

Therefore, when the operation knob 56 is slid, the transmission of the force by the transmission mechanism portion 101 to the upstream fins 45 and 46 is performed by the central upstream fins 45 positioned at the center in the arrangement direction. This prevents the operation torque from being greatly fluctuating when the operation knob 56 is slid. Thus, the operational feeling is improved as compared with the air-conditioning register disclosed in German Patent Application Publication No. 102014100441, in which the combination of the fork portion 124 and the transmission shaft portion 115 (or the combination of a rack and pinion) is used to transmit force, and the transmission of force is performed by one of the upstream fins 114 that is not located at the center in the arrangement direction.

As shown in FIGS. 11A and 11B, as the operation knob 56 tilts, the outer portion 78 of the downstream universal joint UJ1 orbits about the pivots 38 of the downstream fin 35. The distance between the outer portion 78 of the downstream universal joint UJ1 and the outer portion 95 of the upstream universal joint UJ2 varies in accordance with the vertical position of the outer portion 78. The distance between the outer portion 78 of the downstream universal joint UJ1 and the outer portion 95 of the upstream universal joint UJ2 is minimized in the neutral state. The distance is increased as the operation knob 56 is tilted and moves away from the location corresponding to the neutral state.

As shown in FIGS. 12A and 12B, as the operation knob 56 is slid, the outer portion 78 of the downstream universal joint UJ1 also moves in the same direction as the operation knob 56. The distance between the outer portions 78 and 95 varies in accordance with the position in the lateral direction of the outer portion 78. The distance between the two outer portions 78 and 95 is minimized in the neutral state, and is increased as the operation knob 56 slides away from the location corresponding to the neutral state.

In contrast, the transmission shaft 84 does not expand or contract, and the distance between the engagement portion 85 at the downstream end and the engagement portion 88 at the upstream end does not change.

In this regard, the engagement portion 88 of the transmission shaft 84 is movable in the flowing direction of the air-conditioning air A1 by moving the transmission pins 89 along the engagement grooves 98. Therefore, when the operation knob 56 is tilted or slid, the variations in the distance are absorbed as the transmission shaft 84 swings about the engagement portion 88, while the engagement portion 88 moves in the flowing direction. This allows the transmission shaft 84 to swing smoothly without hindrance.

Furthermore, in the first embodiment, the transmission portion 102, which is provided as part of the coupling rod 51, functions as part of the transmission mechanism portion 101. Therefore, it is unnecessary to provide the transmission portion 102 at a location different from the coupling rod 51 or the transmission shaft 84.

Second Embodiment

An air-conditioning register for a vehicle according to a second embodiment will now be described. Differences from the first embodiment will be mainly discussed.

In the second embodiment, the transmission portion 102 constituting a part of the transmission mechanism portion 101 is provided at a location different from the coupling rod 51.

Figure 13:
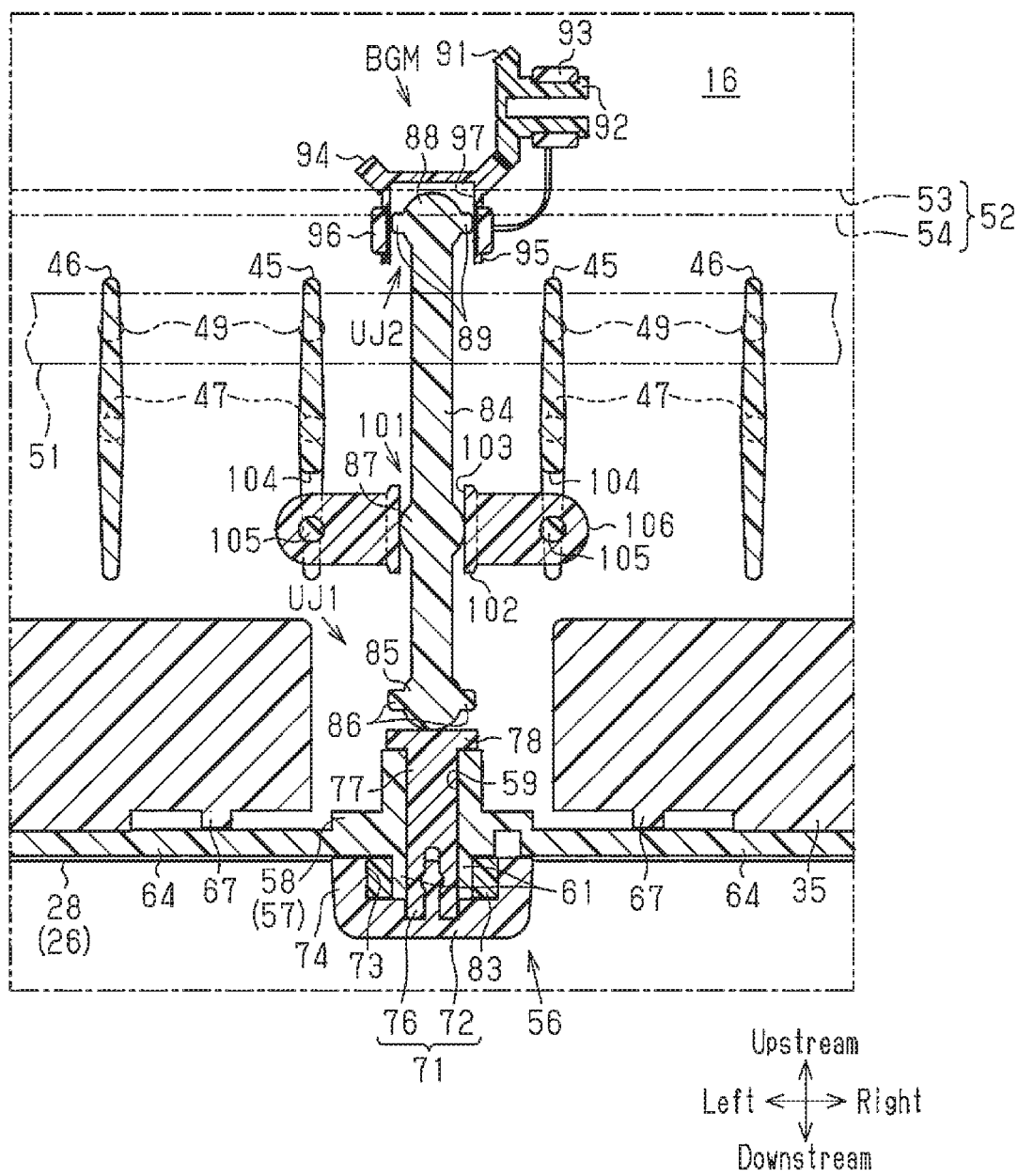
FIG. 13 is a cross-sectional plan view corresponding to FIG. 6, illustrating an air-conditioning register according to a second embodiment.

As shown in FIG. 13, the coupling pins 49 of the upstream fins 45, 46 are provided at sections displaced upstream from the pivots 47. The coupling pins 49 may be provided in the vicinity of the upper side or the lower side of the upstream fins 45, 46 in the vertical direction. In this case, the cutout portions 48 are not necessary unlike the first embodiment. As in the first embodiment, the cutout portions 48 may be provided at the upstream portions of the upstream fins 45, 46, and the coupling pins 49 may be provided in the cutout portions 48. The coupling pins 49 of the upstream fins 45, 46 are coupled together by a coupling rod 51 extending in the lateral direction.

Each of the central upstream fins 45 has a cutout portion 104 and a coupling pin 105. The cutout portion 104 is provided in a downstream portion of each central upstream fin 45. The coupling pin 105 is located on the upper or lower surface of the cutout portion 104 and protrudes from a section displaced downstream from the pivots 47. The coupling pins 105 are coupled together by an auxiliary coupling rod 106, which extends in the lateral direction. The auxiliary coupling rod 106 couples only the two central upstream fins 45 to each other, and is shorter in the lateral direction than the coupling rod 51, which couple all the upstream fins 45, 46 together.

Between the two central upstream fins 45, a transmission portion 102 having a transmission hole 103 is integrally formed in a portion of the auxiliary coupling rod 106 that is close to the transmission shaft 84. The transmission shaft 84 has a spherical contactor 87 in the part that is inserted into the transmission hole 103. The transmission portion 102 and the contactor 87 have the same shape and size as those described in the first embodiment. The dimension in the lateral direction and the dimension in the vertical direction of the transmission hole 103 are determined to have sizes satisfying the above conditions 1 and 2 as in the first embodiment.

The transmission mechanism portion 101 is constituted by the contactor 87, which is provided at a portion of the transmission shaft 84 located between the central upstream fins 45, and the transmission portion 102, which is provided in the auxiliary coupling rod 106 and has the transmission hole 103.

Other than the above described differences, the second embodiment is the same as the first embodiment. Therefore, like or the same reference numerals are given to those components that are like or the same as the corresponding components of the first embodiment and detailed explanations are omitted.

In the second embodiment configured as described above, when a force in the lateral direction, or a force in a direction along the pivots 38 of the downstream fin 35, is applied to the operation knob 56, the transmission shaft 84 swings in the lateral direction about the engagement portion 88. Between the two central upstream fins 45, the swinging motion of the transmission shaft 84 is transmitted to the central upstream fins 45 by the transmission mechanism portion 101, which is constituted by the transmission shaft 84 and the auxiliary coupling rod 106. Each central upstream fin 45 tilts about the pivots 47. The tilting motion of the central upstream fins 45 is transmitted to the upstream fins 46 via the coupling rod 51, so that the upstream fins 46 also tilt about the pivots 47 in the same direction as the central upstream fins 45.

Further, when a force in the vertical direction, or a force in the direction along the pivots 47 of the upstream fins 45, 46, is applied to the operation knob 56, the transmission shaft 84 swings in the vertical direction about the engagement portion 88. However, between the two central upstream fins 45, the swinging motion of the transmission shaft 84 is not transmitted to the central upstream fins 45 by the transmission mechanism portion 101, which is constituted by the transmission shaft 84 and the auxiliary coupling rod 106, so that none of the upstream fins 45, 46 is tilted.

When the knob portion 72 of the operation knob 56 is rotated, the rotation is transmitted to the shut-off damper 52 via the downstream universal joint UJ1, the transmission shaft 84, and the upstream universal joint UJ2, so that the shut-off damper 52 is tilted. However, since the rotation of the transmission shaft 84 is transmitted neither to the downstream fins 35, 36 nor to the auxiliary coupling rod 106, none of the upstream fins 45, 46 and the downstream fins 35, 36 is tilted.

The second embodiment thus achieves the same advantages as the first embodiment. However, the second embodiment requires the auxiliary coupling rod 106 in addition to the coupling rod 51. On the other hand, the location of the coupling rod 51 in the second embodiment is not likely to be restricted by the transmission shaft 84. Therefore, it is possible to reduce the influence on the flow of the air-conditioning air A1 by arranging the coupling rod 51 above or below the upstream fins 45, 46.

Further, since the coupling rod 51 constituted by a member different from the auxiliary coupling rod 106 is installed at a location inconspicuous from the downstream side of the air-conditioning register (from the passenger compartment), the appearance is improved. For example, by arranging the coupling rod 51 above or below the upstream fins 45, 46 as described above, it is possible to obtain the effect of improving the appearance.

The above illustrated embodiments may be modified as follows.

In each of the above illustrated embodiments, the downstream universal joint UJ1 is a so-called ball joint, in which the outer surface of the spherical engagement portion 85 at the downstream end of the transmission shaft 84 is in surface contact with the spherical inner surface of the engagement recess 79 of the outer portion 78. However, other types of joint may be employed. However, the downstream universal joint UJ1 needs to satisfy the condition that the shaft portion 76 and the transmission shaft 84 are coupled such that their intersecting angles can be freely changed.

For example, a cruciform intermediate shaft including two shaft portions orthogonal to each other is provided between the shaft portion 76 and the transmission shaft 84. The upstream end of the shaft portion 76 is bifurcated, and the bifurcated parts are rotationally coupled to the opposite ends of one of the shaft portions of the intermediate shaft. The downstream end of the transmission shaft 84 is bifurcated, and the bifurcated parts are rotationally coupled to the opposite ends of the other shaft portion of the intermediate shaft.

The coupling rod 51 in the second embodiment may be a single member extending in the lateral direction and may couple the coupling pins 49 of all the upstream fins 45, 46 together. Alternatively, the coupling rod 51 may be replaced by a pair of left and right coupling rods extending in the lateral direction. In this case, the coupling pin 49 of the central upstream fin 45 on the right side and the coupling pins 49 of the upstream fins 46 located on the right side of the right central upstream fin 45 are coupled together by the right coupling rod. The coupling pin 49 of the central upstream fin 45 on the left side and the coupling pins 49 of the upstream fins 46 located on the left side of the left central upstream fin 45 are coupled together by the left coupling rod.

In the first embodiment, the coupling rod 51 may couple the upstream fins 45, 46 together at the upstream portions. In this case, the cutout portion 48 may be provided at the upstream portion of each of the upstream fins 45, 46, and the coupling pins 49 may be located upstream of the pivots 47.

In the second embodiment, the coupling rod 51 may couple the upstream fins 45, 46 together at the downstream portions. In this case, the cutout portions 104, the coupling pins 105, and the auxiliary coupling rod 106 may be provided at the upstream portions of the central upstream fins 45.

The number of the downstream fins 36 and the number of the upstream fins 46 may be changed to numbers different from those in the above embodiments.

The air-conditioning register may be provided at a location in the passenger compartment other than the instrument panel.

As long as the above-described air-conditioning register is capable of changing the direction of the air-conditioning air that is delivered from an air conditioner with upstream fins and downstream fins and blown into a compartment, and of blocking the blow with a shut-off damper, the air-conditioning register does not necessarily need to be used in vehicles, but may be employed in wide variety of usages.

The outlet of the above-described air-conditioning register may be arranged to be elongated in the vertical direction. In this case, downstream fins that extend in the vertical direction are used, and these are arranged in the lateral direction. Upstream fins that extend in the lateral direction are used, and these are arranged in a state of being spaced apart from each other in the vertical direction.

The present invention may be applied to a non low-profile air-conditioning register having a rectangular outlet.

The invention claimed is:

1. An air-conditioning register comprising:
   a downstream fin arranged in an airflow passage for air-conditioning air, the downstream fin being tiltably supported with a pivot;
   a plurality of upstream fins arranged upstream of the downstream fin in the airflow passage, each of the upstream fins being tiltably supported with a pivot, wherein two adjacent ones of the upstream fins that are located in a center in an arrangement direction are central upstream fins;
   a coupling rod that couples the upstream fins together at sections displaced from the pivots of the upstream fins;
   a shut-off damper tiltably arranged upstream of the upstream fins in the airflow passage;
   an operation knob that is slidably provided on the downstream fin and includes a rotation member;
   a transmission shaft that extends in a flowing direction of the air-conditioning air in the airflow passage and is arranged between the two central upstream fins;
   an upstream universal joint that couples an upstream end of the transmission shaft to the shut-off damper;
   a downstream universal joint that is located upstream of the pivot of the downstream fin and couples a downstream end of the transmission shaft to the rotation member; and
   a transmission mechanism portion provided between the two central upstream fins, wherein the transmission mechanism portion transmits swinging motion of the transmission shaft caused by sliding of the operation knob to the two central upstream fins, and prevents swinging motion of the transmission shaft caused by operation of the operation knob to tilt the downstream fin from being transmitted to the two central upstream fins, wherein
   the transmission mechanism portion includes
      a transmission portion that is indirectly coupled to the two central upstream fins to transmit force and has a transmission hole into which the transmission shaft is inserted, and
      a contacting portion that is provided at a section of the transmission shaft that is inserted in the transmission hole,
   the contacting portion is spherical and has a diameter larger than a diameter of the transmission shaft,
   the transmission hole has an inner wall surface defined by upper, lower, left, and right inner wall surfaces, the inner wall surface being configured to interact with the contacting portion and transmit swinging motion of the transmission shaft to the transmission portion only when the transmission shaft swings about the upstream end as the operation knob is slid, and
   a lateral dimension of the transmission hole is larger than the diameter of the contacting portion and is set to a size that allows the contacting portion to contact the left and right inner wall surfaces of the transmission hole in accordance with the swinging motion of the transmission shaft caused by sliding of the operation knob.

2. The air-conditioning register according to claim 1, wherein the transmission mechanism portion is constituted by a part of the transmission shaft that is located between the two central upstream fins and a part of the coupling rod that is located between the two central upstream fins.

3. The air-conditioning register according to claim 1, further comprising an auxiliary coupling rod, wherein
the auxiliary coupling rod is provided between the two central upstream fins and couples a section of one of the two central upstream fins that is displaced from the pivot thereof to a section of the other central upstream fin that is displaced from the pivot thereof, and
the transmission mechanism portion is constituted by the auxiliary coupling rod and a part of the transmission shaft that is located between the two central upstream fins.

4. The air-conditioning register according to claim 1, further comprising a bevel gear mechanism that couples the upstream end of the transmission shaft and the shut-off damper to each other, wherein
the bevel gear mechanism includes
a driven-side bevel gear provided on the shut-off damper, and
a driving-side bevel gear meshed with the driven-side bevel gear,
the upstream universal joint includes
a spherical engagement portion provided at the upstream end of the transmission shaft, and
an outer portion that is provided at the driving-side bevel gear,
the outer portion includes a closed upstream end and an open downstream end,
an interior space of the outer portion constitutes an engagement recess, and
the engagement portion is engaged with the engagement recess.

5. The air-conditioning register according to claim 1, wherein
a dimension of the transmission hole in a direction along the pivot of the downstream fin is set to be smaller than a dimension of a region in which the contacting portion moves when the transmission shaft swings about the upstream end as the operation knob is slid in a state in which the transmission portion is absent, and
a dimension of the transmission hole in a direction along the pivots of the upstream fins is set to be larger than a dimension of a region in which the contacting portion moves when the transmission shaft swings about the upstream end as the operation knob is operated to tilt the downstream fin in a state in which the transmission portion is absent.

6. The air-conditioning register according to claim 1, wherein
a downstream edge of the downstream fin linearly extends in a direction along the pivot of the downstream fin, and
the pivot of the downstream fin is provided at a downstream end of the downstream fin in the flowing direction.

* * * * *